United States Patent
Nanba et al.

(10) Patent No.: US 6,269,476 B1
(45) Date of Patent: Jul. 31, 2001

(54) INFORMATION PROCESSING APPARATUS, METHOD, AND RECORDING MEDIUM FOR RECORDING A COMPUTER PROGRAM TO BE EXECUTED BY A COMPUTER TO CARRY OUT PROCESSING OF CONSTRUCTING SOFTWARE

(75) Inventors: Shinji Nanba; Toru Mineyama, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/174,699

(22) Filed: Oct. 19, 1998

(30) Foreign Application Priority Data

Oct. 22, 1997 (JP) ................................ 9-289690

(51) Int. Cl.[7] ................................................ G06F 9/45
(52) U.S. Cl. ...................................... 717/2; 717/1
(58) Field of Search ........................ 717/2, 1, 11

(56) References Cited

U.S. PATENT DOCUMENTS

| | | | |
|---|---|---|---|
| 5,499,371 | * 3/1996 | Henninger et al. | 395/700 |
| 5,675,801 | * 10/1997 | Lindsey | 395/702 |
| 5,835,911 | * 11/1998 | Nakagawa et al. | 707/203 |
| 5,875,331 | * 2/1999 | Lindsey | 395/702 |
| 5,920,718 | * 7/1999 | Uczekaj et al. | 395/702 |
| 5,924,101 | * 7/1999 | Bach et al. | 707/103 |
| 5,978,581 | * 11/1999 | Sadiq et al. | 395/702 |

OTHER PUBLICATIONS

Henninger, An Evolutionary Approach to Constructing Effective Software Reuse Repositories, ACM. pp. 111–140, Apr. 1997.*

McGregor et al. Using an Architectural Knowledge Base to Generate Code for Parallel Computers. ACM. pp. 1065–1072, Sep. 1989.*

* cited by examiner

Primary Examiner—Mark Powell
Assistant Examiner—Wei Zhen
(74) Attorney, Agent, or Firm—Sonnenschein, Nath & Rosenthal

(57) ABSTRACT

A build object of build class Builder has build method build (Object resolved) for building reference relations among construction-element objects by calling a field setting method owned by construction-element object resolved. A get object of class Getter has get method get object ( ) for acquiring a construction-element object and is also allowed to own a build object. In the get object, construction-element object resolved is acquired by calling get method get object ( ). In a build object owned by the get object, construction-element object resolved acquired by the get object is initialized by build method build (Object resolved). By adopting the procedure described above, construction-element objects required for constructing desired software such as an application program can be collected for constructing the desired software.

9 Claims, 13 Drawing Sheets

FIG. 5
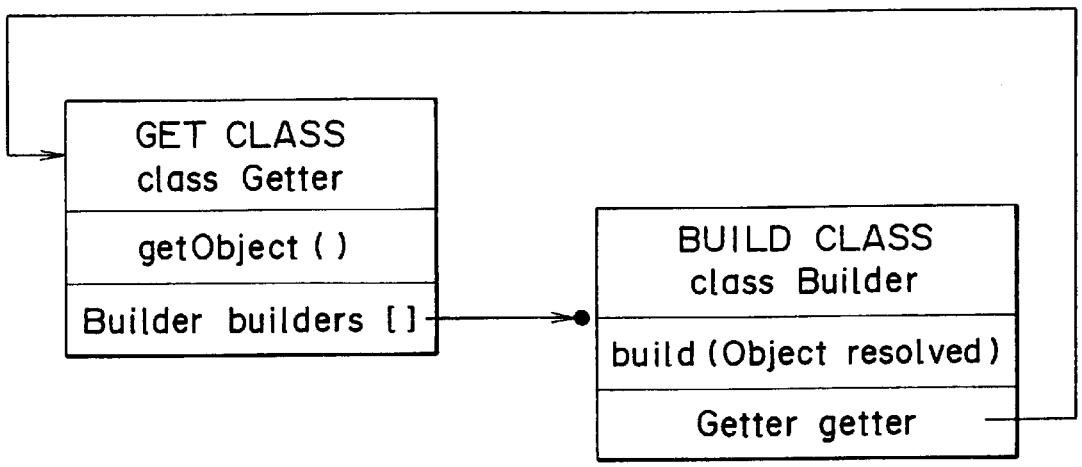
FIG. 6A
FIG. 6B
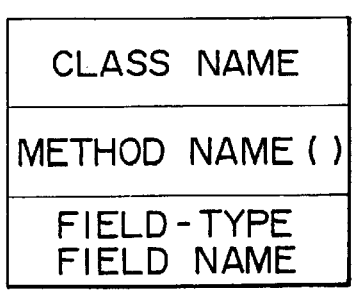
REFERS TO OBJECT ⟶ 1 OBJECT
REFERS TO OBJECT ⟶• 1 OR MORE OBJECTS

FIG. 8
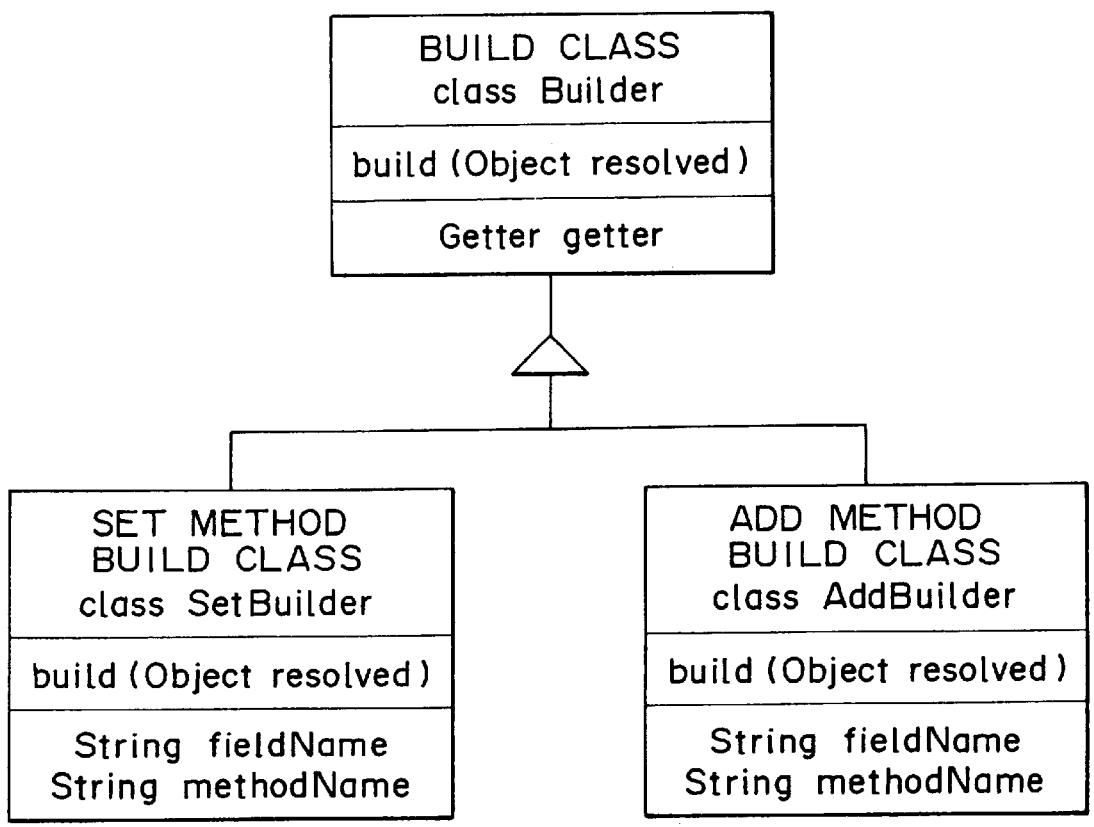
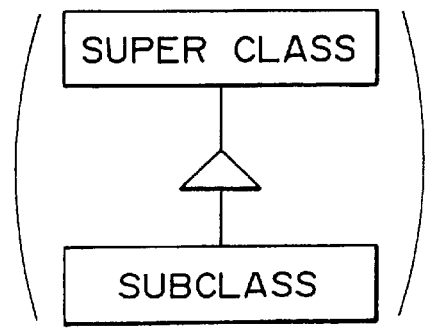

FIG. 13

| CONSTRUCTION-ELEMENT OBJECT | REQUIRED GET OBJECTS | REQUIRED BUILD OBJECTS |
|---|---|---|
| obj 1 | Getter 1 | Builder 1-1<br>Builder 1-2 |
| obj 2 | Getter 2 | Builder 2 |
| obj 3 | Getter 3-1<br>Getter 3-2 | |
| obj 4 | Getter 4 | Builder 4-1<br>Builder 4-2 |
| obj 5 | Getter 5 | |
| obj 6 | Getter 6 | Builder 6-1<br>Builder 6-2 |
| obj 7 | Getter 7 | |
| obj 8 | Getter 8 | Builder 8 |

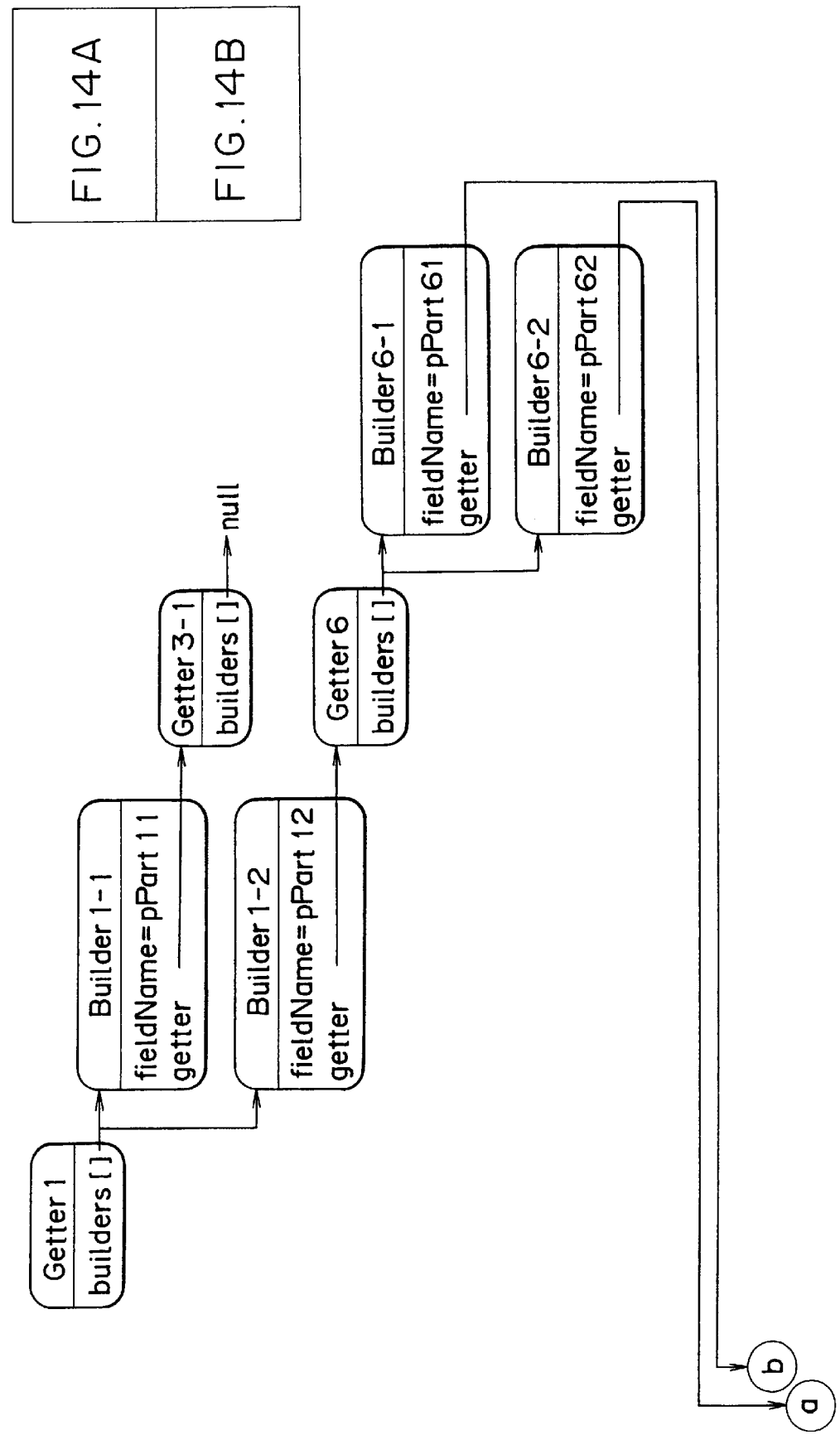

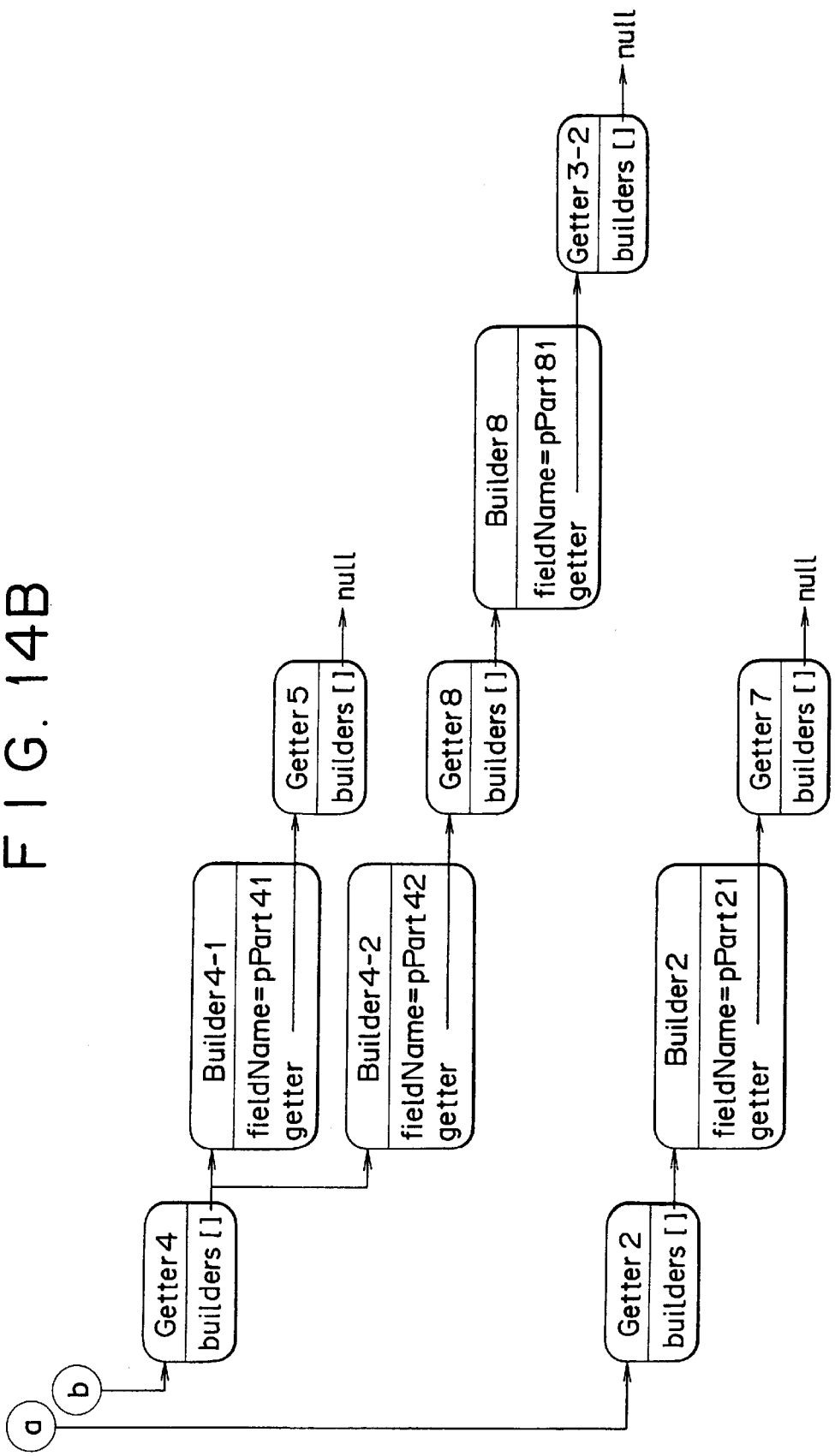
F I G. 14B

INFORMATION PROCESSING APPARATUS, METHOD, AND RECORDING MEDIUM FOR RECORDING A COMPUTER PROGRAM TO BE EXECUTED BY A COMPUTER TO CARRY OUT PROCESSING OF CONSTRUCTING SOFTWARE

BACKGROUND OF THE INVENTION

In general, the present invention relates to an information processing apparatus, an information processing method and a recording medium. More particularly, the present invention relates to an information processing apparatus, an information processing method and a recording medium that allow, for example, a plurality of objects used as elements for constructing an application program or multimedia contents and other data utilized in an application program to be acquired and linked to each other in order to build or construct the application program or the multimedia contents and the other data even if these objects are distributed among information, build sites.

In the field of object-oriented technology, component-software technology has come to draw increasingly attention in recent years. The component-software technology is a technique or a technology of building or constructing an application program or multimedia contents and other data used in an application program by linking a plurality of components.

By the way, a plurality of objects used as elements for constructing an application program built by using the component-software technology are presented in a form that allows a class for composing the application program to statically link reference relations of the objects.

In addition, a plurality of objects used as elements for constructing multimedia contents and information such as document data utilized by an application program are stored in a file to be presented to the user. In the file, the objects are serialized, so to speak, into a series of bytes.

Thus, if the objects are scattered throughout a network for example, it is difficult to collect only necessary objects, then to link them dynamically, that is, to construct reference relations among them, and finally to build an application program or multimedia contents or the like whenever necessary.

SUMMARY OF THE INVENTION

It is thus an object of the present invention addressing the problem described above to provide an information processing apparatus, an information processing method and a recording medium that allow, for example, a plurality of objects used as elements for constructing an application program or multimedia contents and other data used in an application program to be acquired and dynamically linked to each other in order to build or construct the application program or the multimedia contents and the other data even if these objects are distributed among information, build sites.

An information processing apparatus for carrying out processing to construct desired software (that is, a desired application program, multimedia contents or other data) by acquiring a plurality of construction-element objects required for constructing the desired software and initializing the construction-element objects according to the present invention is characterized in that the information processing apparatus includes; build objects each owning a build method which is used for constructing reference relations among the construction-element objects by calling a field setting method if the construction-element objects each have the field setting method for setting a field of the construction-element object in order to initialize the construction-element object, and get objects which each own a get method for acquiring a construction-element object and are each capable of owning one of the build objects, wherein the get objects are each used for acquiring a construction-element object by using the get method of the get object, and the build object owned by the get object is used for initializing a construction-element object acquired by the get object by using the build method owned by the build object.

An information processing method adopted in an information processing apparatus for carrying out processing to construct desired software by acquiring a plurality of construction-element objects required for constructing the desired software and initializing the construction-element objects according to the present invention is characterized in that the information processing apparatus includes; build objects each owning a build method which is used for constructing reference relations among the construction-element objects by calling a field setting method if the construction-element objects each have the field setting method for setting a field of the construction-element object in order to initialize the construction-element object, and get objects which each own a get method for acquiring a construction-element object and are each capable of owning one of the build objects, wherein the get objects are each used for acquiring a construction-element object by using the get method of the get object, and the build object owned by the get object is used for initializing a construction-element object acquired by the get object by using the build method owned by the build object.

A recording medium for recording a computer program to be executed by a computer to carry out processing of constructing desired software by acquiring a plurality of construction-element objects required for constructing the desired software and initializing the construction-element objects according to the present invention is characterized in that the computer program includes; build objects each owning a build method which is used for constructing reference relations among the construction-element objects by calling a field setting method if the construction-element objects each have the field setting method for setting a field of the construction-element object in order to initialize the construction-element object, and get objects which each own a get method for acquiring a construction-element object and are each capable of owning one of the build objects, and the processing includes the steps of letting each of the get objects acquire a construction-element object by using the get method of the get object, and letting the build object owned by the get object initialize a construction-element object acquired by the get object by using the build method owned by the build object.

In the information processing apparatus according to the present invention, build objects each owns a build method which is used for constructing reference relations among construction-element objects by calling a field setting method for setting a field of the construction-element object in order to initialize the construction element object, and get objects each own a get method for acquiring a construction-element object and are each capable of owning one of the build objects.

In this case, the get objects are each used for acquiring a construction-element object by using the get method of the get object, and the build object owned by the get object is used for initializing a construction-element object acquired by the get object by using the build method owned by the build object.

The information processing method according to the present invention includes the steps of letting each of the get objects acquire a construction-element object by using the get method of the get object, and letting the build object owned by the get object initialize a construction-element object acquired by the get object by using the build method owned by the build object.

The recording medium according to the present invention is used for recording a computer program to be executed by a computer to carry out processing of constructing desired software by acquiring a plurality of construction-element objects required for constructing the desired software and initializing the construction-element objects, wherein the computer program includes; build objects each owning a build method which is used for constructing reference relations among the construction-element objects by calling a field setting method if the construction-element objects each have the field setting method for setting a field of the construction-element object in order to initialize the construction-element object, and get objects which each own a get method for acquiring the construction-element object and are each capable of owning one of the build objects, and the processing includes the steps of letting each of the get objects acquire a construction-element object by using the get method of the get object, and letting the build object owned by the get object initialize a construction-element object acquired by the get object by using the build method owned by the build object.

BRIEF DESCRIPTION OF THE DRAWINGS

FIG. 5 is a diagram showing a relation between a get class and a build class;

FIGS. 6A and 6B are explanatory diagrams used for describing the relation shown in FIG. 5;

FIG. 8 is a diagram showing subclasses to the build class;

FIG. 13 is a diagram showing get objects and build objects required in the construction of the desired software show in FIG. 12; and FIGS. 14, 14A and 14B are diagrams showing relations among the get objects and the build objects required in the construction of the desired software shown in FIG. 12.

DETAILED DESCRIPTION OF THE PREFERRED EMBODIMENTS

Figure 1:
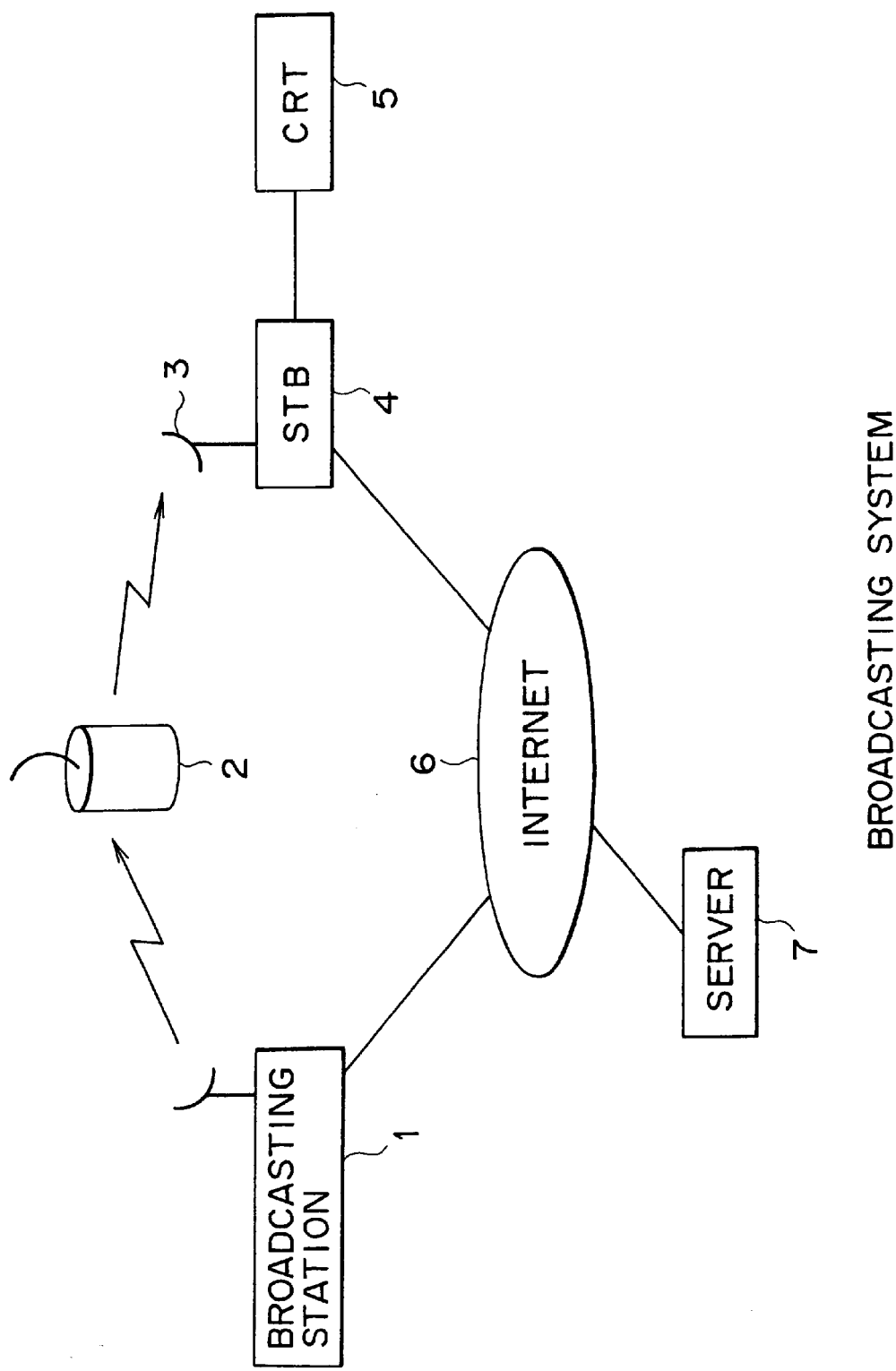
FIG. 1 is a diagram showing a typical configuration of an embodiment implementing a broadcasting system to which the present invention is applied.

FIG. 1 is a diagram showing a typical configuration of an embodiment implementing a broadcasting system to which the present invention is applied. A system is an entity obtained as a result of logically setting a plurality of apparatuses without regard to whether or not the apparatuses are physically accommodated in a cabinet.

At broadcasting station 1, a radio wave is transmitted as a television broadcast signal. The radio wave is received by an antenna 3 through a satellite 2 which can be a communication satellite or a broadcasting satellite. The signal received by the antenna 3 is passed on to an STB (Set Top Box) 4 where a television broadcast signal of a predetermined channel is picked up. The television broadcast signal is supplied by the STB 4 to a CRT 5 to be displayed thereon.

It should be noted that the STB 4 is also capable of receiving television broadcast signals transmitted by broadcasting stations, not shown in the figure, other than the broadcasting station 1.

By the way, the STB 4 is capable of displaying an EPG (Electric Program Guide) on the CRT 5 to allow the user to recognize an outline of programs broadcasted through each channel.

If the number of channels to be introduced increases and, furthermore, if each program is not only introduced by displaying a text including the title of the program, but is also introduced through other media such as moving pictures and sound, that is, if an EPG is used as multimedia contents, however, the amount of data will become extremely large. Such a large amount of EPG data transmitted to the STB 4 by way of the satellite 2 may cause hindrances to the ordinary program broadcasting. In addition, in some cases, it is desired to change the contents of the EPG dynamically. If a transmitted EPG is composed at the broadcasting station 1, it will be difficult to change the program dynamically.

In order to solve this problem, an EPG is distributed by dividing it into a variety of components composing the EPG and the STB 4 is made capable of collecting required components and dynamically building an EPG from the collected components.

To put it in detail, in the embodiment shown in FIG. 1, components pertaining an EPG are distributed typically on the Internet 6. To put it concretely, the broadcasting station 1, the STB 4 and a server 7 are connected to the Internet 6 as shown in FIG. 1 and the components used as elements for constructing the EPG are stored in each of the broadcasting station 1, the STB 4 and a server 7. The STB 4 collects components stored therein and, if necessary, components stored in the broadcasting station 1 and the server 7 through the Internet 6 to construct the EPG.

Figure 2:
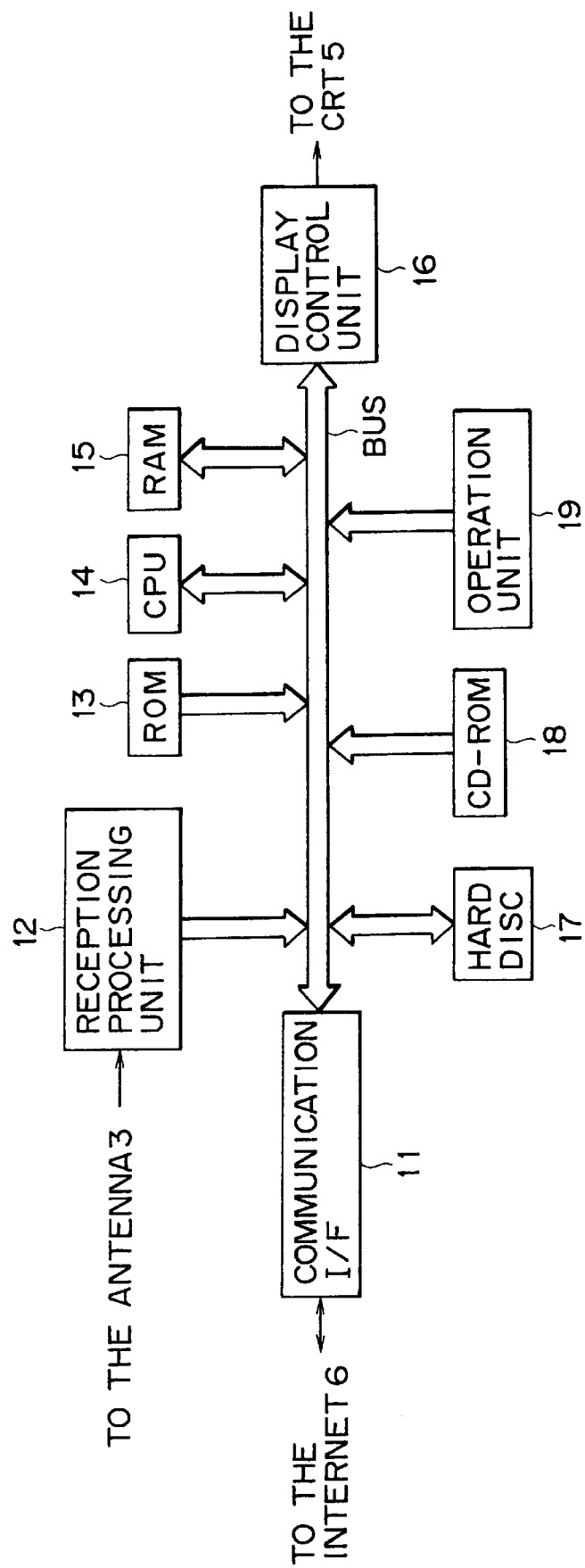
FIG. 2 is a block diagram showing an example of the configuration of an STB 4 shown in FIG. 1.

FIG. 2 is a block diagram showing an example of the configuration of the STB 4 shown in FIG. 1.

In the configuration shown in FIG. 2, a communication I/F (interface) 11 is typically a modem for controlling communication with the Internet 6. A reception processing unit 12 comprises components typically including a down converter, a tuner, a demodulation circuit and a descrambler. The reception processing unit 12 picks up a predetermined television broadcasting signal from signals received by the antenna 3 and, if necessary, descrambles the fetched signal before supplying it to a display control unit 16.

A ROM (Read-Only Memory) unit 13 is used for storing, among other things, an IPL (Initial Program Loading) program. A CPU (Central Processing Unit) 14 executes a variety of application programs stored in a hard disc 17 under control of an OS (Operating System) also stored in the hard disc 17 in order to carry out processing wherein components of an EPG are collected and linked to each other to construct the EPG. This processing is appropriately referred to hereafter as build (construction) processing and an application program executed to carry out the build processing is appropriately referred to hereafter as a builder program. A RAM (Random-Access Memory) unit 15 is used for temporarily storing, among other things, a program currently being executed by the CPU 14 and data required during the execution. The display control unit 16 controls an operation to display data supplied thereto on the CRT 5.

The hard disc 17 is used for storing the OS and application programs as described above. In addition, the hard disc 17 is also used for storing components of an EPG when necessary. It should be noted that components of an EPG can be obtained from the broadcasting station 1 and the server 7 through the Internet 6. In this case, the communication I/F 11 is driven to establish communication with the broadcasting station 1 and the server 7 through the Internet 6. As an alternative, the broadcasting station 1 is requested to broadcast components of an EPG which are then received by the reception processing unit 12. In addition, the hard disc 17 is also used for storing information such as data required in execution of a program by the CPU 14 to carry out processing and results obtained from the processing whenever necessary.

A CD-ROM (Compact Disc ROM) 18 is used for storing data such as components of an EPG. An operation unit 19 comprises components such as a keyboard, a mouse and a variety of buttons to be operated by the user for entering data or a command.

The blocks composing the STB 4 described above are connected to each other by a bus.

Assume that the user operates the operation unit 19 to request the STB 4 with a configuration described above to receive a signal of a certain channel. In this case, the reception processing unit 12 extracts a television broadcasting signal of the channel specified by the user via the operation unit 19 from signals received by the antenna 3 and supplies the extracted signal to the CRT 5 to be displayed thereon by way of the display control unit 16.

In another example, assume that the user requests that an EPG be displayed by operating the operation unit 19. In this case, the CPU 14 executes the builder program stored in the hard disc 17 in order to carry out the build processing to construct the EPG. Components required to construct the EPG are read out from the hard disc 17 and the CD-ROM 18 or obtained by communication with the broadcasting station 1 and the server 7 which is established by the communication I/F 11 through the Internet 6. Then, the CPU 14 dynamically links these components to each other, building the EPG. The EPG is finally supplied to the CRT 5 to be displayed thereon by way of the display control unit 16.

It should be noted that the builder program is written in one of object oriented languages such as the Java language where Java is a trademark. For the sake of uniformity, all program lists in this specification are also written in the Java language. Details of the Java language are described in references such as "Java API Programming Guide," a publication of Kogaku Tosho authored by Tatsuya Aoyanagi, "Java Power Programming," a publication of Soft Bank authored by Paul Tyma, Gabriel Torok and Troy Dowing, "The Java Language Specification" published by Java Soft and "Java Core Reflection, API and Specification" also published by Java Soft. For more information on the Java language, refer to these references.

Figure 3:
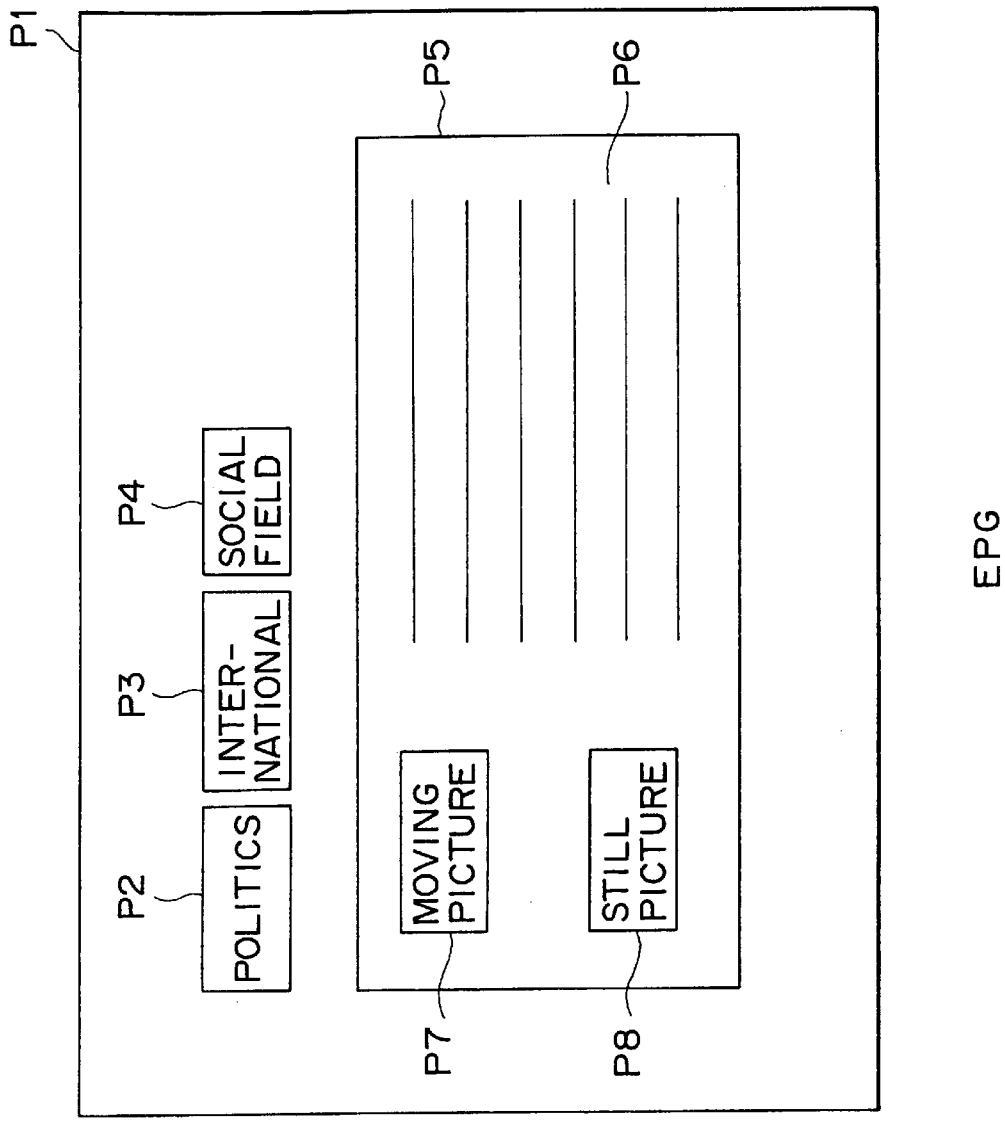
FIG. 3 is a diagram showing an example of an EPG constructed by carrying out build processing.

FIG. 3 is a diagram showing an example of an EPG constructed by carrying out the build processing. In this embodiment, the EPG is a news program guide comprising 8 components P1 to P8.

Component P1 is the background of the EPG on which other components P2 to P4 and component P5 are superposed. Components P2 to P4 are each a button used for selecting a news genre. If one of components P2 to P4 is operated, components P6 to P8 change. To put it in detail, if one of components P2 to P4 is operated as a button typically by clicking the mouse of the operation unit 19, components P6 to P8 change to information for news in the political, international or social field corresponding to component P2, P3 or P4 respectively which is selected by the user. Component P5 is the background for components P6 to P8 which are text data, moving-picture data and still-picture data respectively. The news genre corresponding to the operated button P2, P3 or P4 is displayed in terms of a text (component P6), a moving picture (component P7) and a still picture (component P8).

Assume that information on news of a certain genre is displayed as components P6 to P8. In this case, if one of components P6 to P8 is clicked, a news program for the genre is displayed in place of the EPG shown in FIG. 3.

Figure 4:
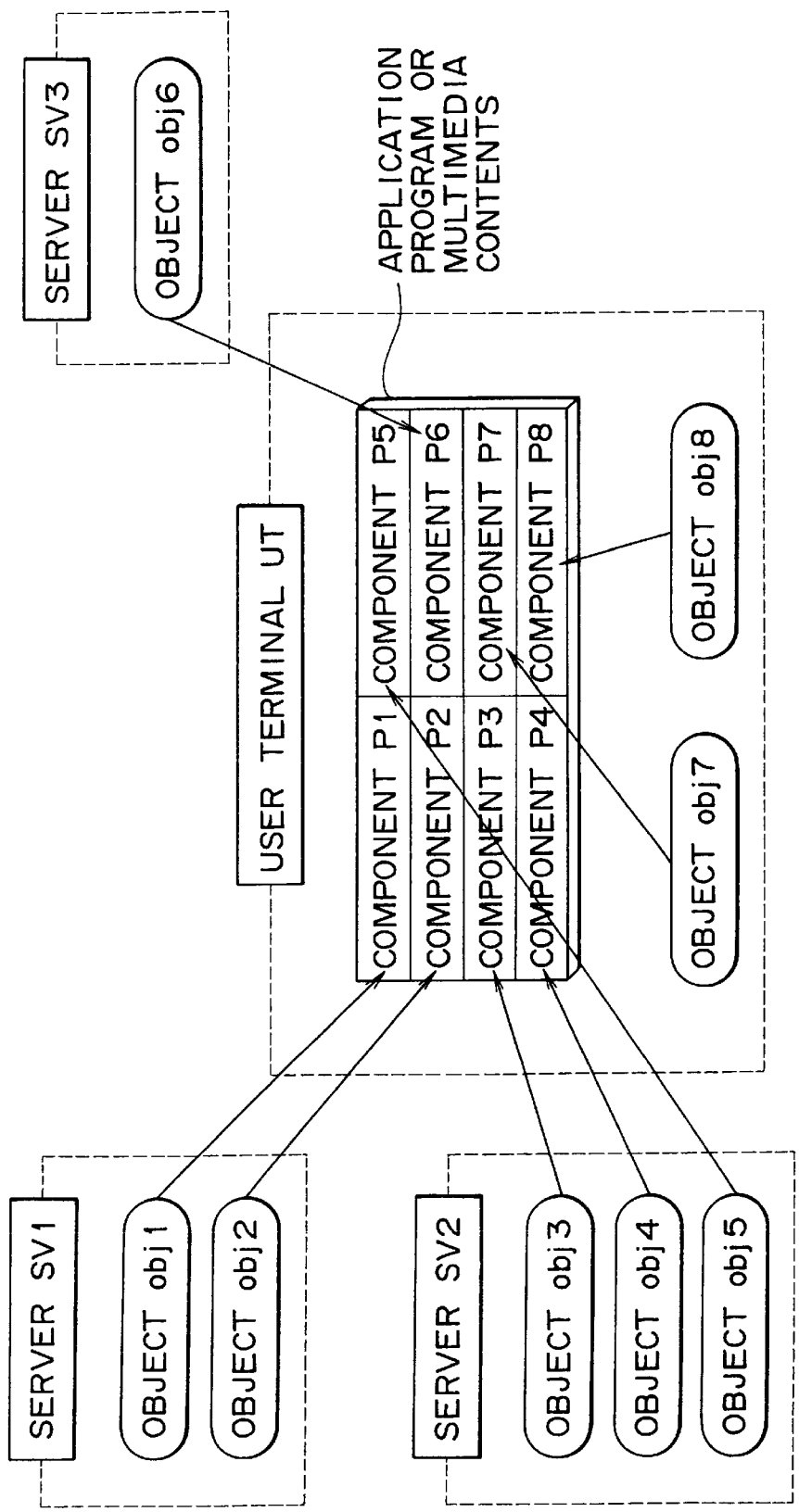
FIG. 4 is a diagram showing that components used for constructing the EPG shown in FIG. 3 are distributed throughout a network.

Let components P1 to P8 of the EPG be respectively objects obj1 to obj8 used to construct the EPG. Also assume that objects obj1 to obj8 are distributed throughout the network as shown in FIG. 4. To put it in detail, construction-element objects obj1 and obj2 are stored in server SV1 whereas construction-element objects obj3 to obj5 are stored in server SV2. Construction-element object obj6 is stored in server SV3 whereas construction-element objects obj7 and obj8 are stored in user terminal UT. Construction-element objects obj1 to obj8 are stored not in a state of being statically linked to each other. That is to say, construction-element objects obj1 to obj8 are each stored in a so-called independent state.

It should be noted that servers SV1 to SV3 shown in FIG. 4 each correspond to a server connected to the Internet 6 shown in FIG. 1 such as the server 7 and user terminal UT shown in FIG. 4 corresponds to the STB 4 shown in FIG. 1.

So, in this case, the builder program is executed at user terminal UT to acquire construction-element objects obj1 to obj8 distributed throughout the network, then to link these objects to each other, that is, to create reference relations, and finally to build or to construct an EPG as built software.

Thus, in the builder program, if each of the construction-element objects has a field setting method whereby initialization of the construction-element object is carried out by setting its own fields, the field setting method is called to initialize the construction-element object. In addition, in the builder program, a build class, a get class and a bind class are defined. The build class has a build method for building reference relations among construction-element objects. The get class has a get method for acquiring a construction-element object and is allowed to own a construction-element object. The bind class has a bind method for cataloging construction-element objects acquired by a get object.

To put it in detail, the get class has get method get object ( ) for getting construction-element objects distributed throughout the network. By executing get method get object ( ), a desired construction-element object can be obtained as a return value of the get method. In the get class, a definition is included so that the get object is allowed to own a build object, an instance of a build class. A build object owned by the get class is used by a get object, an instance of the get class, for initialization of the construction-element object which is acquired by execution of get method get object ( ). That is to say, in the get class, a Builder-type field is defined provided that the build class is named Builder.

The build class has build method build (Object resolved) for building reference relations among construction-element objects, that is, for initializing the construction-element objects. The 'resolved' object type which is used as the argument of build method build (Object resolved) specifies a construction-element object to be initialized. Object, the name of a type, is a class defined as a class at the top hierarchical level in the Java language.

In the build class, a definition is included so that the build object is allowed to own a get object for acquiring a construction-element object required by a build object (an instance of the build class) for execution of build method build (Object resolved). To put it in detail, assume for example that construction-element object 'resolvedA' has been acquired and there is a reference relation from construction-element object 'resolvedA' to 'resolvedB', another construction-element object. Thus, construction-element object 'resolvedB' is referenced during initialization of construction-element object 'resolvedA'. It is therefore necessary to acquire construction-element object 'resolvedB'. For this reason, in the build class, a Getter-type field is defined provided that the get class is named Getter.

As a result, a relation between the get class and the build class like one shown in FIG. 5 is obtained. It should be noted that, in FIG. 5, a rectangular block oriented in the vertical direction and divided into three layers represents a class. As shown in FIG. 6A, the top layer of a class is used for describing the name of the class. The second layer is used for describing the name of a method defined in the class. The bottom layer is used for describing the name of a field defined in the class.

As described above, get class Getter has get method get object ( ) and a Builder-type field named builders [ ]. The Builder-type field is an array which will be described later.

On the other hand, build class Builder has build method build (Object resolved) and a Getter-type field named getter.

As shown in FIG. 5, an arrow starts from an instance of a start class (which can be a get or build class) and ends at an instance of an end class (which can be a build or get class), indicating that the instance of the start class is allowed to own a field of the same type as the end class, that is, an instance of the end class. As shown in FIG. 6B, an arrow ending with a symbol means that the instance of its start class is allowed to own a plurality of instances of its end class. On the other hand, an arrow not ending with a symbol means that the instance of its start class is allowed to own only 1 instance of its end class. Thus, the get object is allowed to own a plurality of build objects while the build object is allowed to own only 1 get object.

Get method get object ( ) defined in the get class is a so-called polymorphic method. An example of a polymorphic method is a method defined in a super class and implemented in 2 or more subclasses to the super class. The polymorphic method can be used in either implementation. Thus, get method get object ( ) has a variety of implementations in subclasses and can use a desired one of the implementations.

Figure 7:
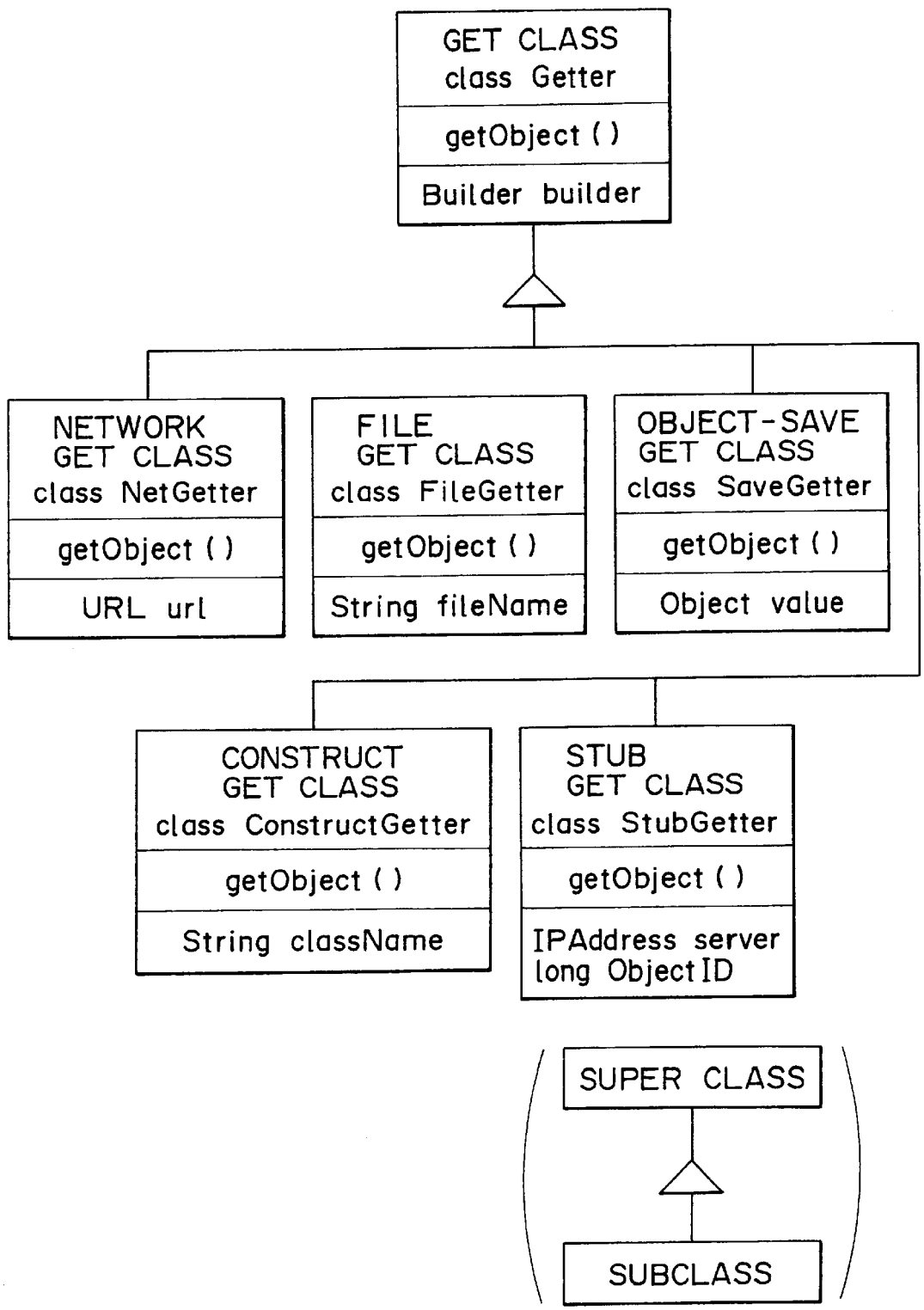
FIG. 7 is a diagram showing subclasses to the get class.

That is to say, get method get object ( ) has its implementations in subclasses instead of the get class. To put it concretely, as an example, assume that as subclasses to the get class, a network get class named NetGetter, a file get class named FileGetter, an object-save get class named SaveGetter, a stub get class named StubGetter and a construct get class named ConstructGetter are defined as shown in FIG. 7.

In the network get class named NetGetter, get method getobject ( ) is implemented to load and deserialize a construction-element object serialized and stored in a file at server SV1, SV2 or SV3 which serves as a remote host computer. Deserialization means conversion of a construction-element object, which has been serialized into a series of bytes, into a usable state. In the network get class named NetGetter, the implementation of get method getobject ( ) includes a URL-type field named url which is defined to describe a URL (Uniform Resource Locator) of the construction-element object. The URL is required when using get method getobject ( ) to acquire the construction-element object which was serialized and stored in a file.

In the file get class named FileGetter, get method getobject ( ) is implemented to load and deserialize a construction-element object serialized and stored in a file, strictly speaking, a local file, at user terminal UT. In the file get class named FileGetter, the implementation of get method getobject ( ) includes a String-type field named fileName which is defined to describe the name of the local file. The name of the local file is required when using get method getobject to acquire the construction-element object which was serialized and stored in the file.

In the object-save get class named SaveGetter, get method getobject ( ) is implemented to acquire a construction-element object owned by this get class. In the object-save get class named SaveGetter, the implementation of get method getobject ( ) includes an Object-type field value which is defined to describe a value used for identifying the construction-element object owned by this get class. This value is required when using get method getobject ( ) to acquire the construction-element object.

In the stub get class named StubGetter, get method getobject ( ) is implemented to acquire a construction-element object presented as a stub from server SV1, SV2 or SV3 which serves as a remote host computer. In the stub get class named StubGetter, the implementation of get method getobject ( ) includes an IPaddress server long type field objectID which is defined to describe the IP (Internet Protocol) address of the server. The IP address is required when using get method getobject ( ) to acquire the construction-element object presented as a stub from the server.

In the construct get class named ConstructGetter, get method getobject ( ) is implemented to acquire a construction-element object constructed by calling a constructor for the construction-element object. In the construct get class named ConstructGetter, the implementation of get method getobject ( ) includes a String-type field className which is defined to describe the name of the class of the construction-element object. The name of the class is required when using get method getobject ( ) to acquire the construction-element object constructed by calling a constructor for the construction-element object.

As described above, get method getobject ( is implemented as a polymorphic method, that is, implementations of get method getobject ( ) are each given in a subclass of the get class. Thus, a variety of construction-element objects can be acquired by calling get method getobject ( ) implemented in the respective subclasses without defining get classes corresponding to methods to acquire the construction-element objects.

It should be noted that subclasses to the get class are not limited to the subclasses described above. A variety of other subclasses can be defined to implement required get methods getobject ( ).

In a get object, an instance of the get class like the one described above, get method getobject owned thereby is called to acquire a construction-element object associated with the implementation of the get method. In the construction-element object acquired in this way, a method to reference another construction-element object can be set. In some cases, the other construction-element object needs to be referenced during initialization of the acquired build-element. For example, assume that a get object is used for acquiring construction-element object ResolvedC as an instance of class ResolvedC defined in program list (1) as follows:

```
class ResolvedC extends Object(
    private int fieldA;
    private int fieldB;
    private void setFieldA(int f){
        fieldA=f;
    }
    public void setFieldB(int f){
        fieldB=f;
    }
    ...
}                                    ... (1)
```

In this example, class ResolvedC is treated as a subclass to the object class object, a super class thereof. In Java, all objects that exist in the language pertain eventually to the object class Object. As shown in program list (1) above, in class ResolvedC, fields fieldA and fieldb are declared. Since fields fieldA and fieldb are declared, field setting methods setFieldA (int f) and setFieldB (int f) are also defined to be executed to carry out initialization by setting fields fieldA and fieldB respectively. It should be noted that, in this embodiment, field setting methods are defined as public methods.

The get object for acquiring construction-element object resolvedc owns a build object for initializing construction-element object resolvedc. That is to say, the get object owns a build object that calls field setting methods setFieldA (int f) and setFieldB (int f). Thus, after construction-element object resolvedC has been acquired, a build method owned by the build object is called. The build method in turn calls field setting methods setFieldA (int f) and setFieldB (int f). As a result, fields fieldA and fieldB are set.

It should be noted that construction-element object resolvedc, an instance of class ResolvedC shown in program list (1), has 2 fields, namely, fieldA and fieldB, as fields to be set. In the case of a construction-element object having a plurality of fields to be initialized like construction-element object resolvedc described above, build objects owned by the get object used for acquiring the construction-element object are declared as an array in the get object to allow the fields to be initialized with ease.

To put it in detail, in the get object used for acquiring the construction-element object resolvedC, build objects for calling field setting methods setFieldA (int f) and setFieldB (int f) are declared as array builders [ ] of the Builder type. Thus, by writing a program typically like program list (2) shown below for the get object, a plurality of fields owned by the acquired construction-element object can all be initialized.

```
for(int j=0; j<builders.length; j++)
    builders(j) .build(resolved);
                                     ... (2)
``` where builders length is the length of field builder [ ] which is an array. Argument 'resolved' of build method build (resolved) refers to a construction-element object to be initialized as described above. In this example, the argument indicates construction-element object resolvedC.

It should be noted that, in the case of a construction-element object requiring no initialization, that is, in the case of a construction-element object having no fields or a construction-element object with fields requiring no initialization, it is not necessary to provide a get object used for acquiring the construction-element object with a build object for the initialization.

It is also not always necessary to provide a get object used for acquiring a construction-element object having a plurality of fields with as many build objects as the fields. This is because some of the fields owned by the acquired construction-element object may have been initialized by the time the construction-element object is acquired for some reasons. Thus, it is necessary to provide the get object used for acquiring the construction-element object only with as many build objects as fields that have not been initialized by the time the construction-element object is acquired.

In addition, in the case of a construction-element object having a plurality of fields to be initialized, as described above, build objects provided to a get object for acquiring the construction-element object are declared as an array. As an alternative, a so-called container class is used as a subclass to the build class and, by using the container class, a plurality of fields can also be initialized with ease.

In addition, while a 'for' statement is used in program list (2), other statements such as a 'while' statement is also usable as well.

Next, assume that a certain get object is used to acquire construction-element object resolvedA, an instance of class ResolvedA which is defined as follows.

```
class ResolvedA extends Object{
    private ResolvedB fieldA;
    private Object painters[]
    public void setFieldA (ResolvedB f){
        fieldA=f;
    }
    public void addPainter(Object p,int index){
        painters [index]=p;
    }
    ...
}
                                     ... (3)
```

Let class ResolvedA be a subclass to the super class Object. As shown in program list (3), in class ResolvedA, fieldA of a ResolvedB type and painters [ ] of the Object type are declared as fields. Since fieldA and painters [ ] are declared, field setting methods setFieldA (ResolvedB f) and add painter (Object p, int index) are also defined to be executed to carry out initialization by setting fields fieldA and painters [ ] respectively.

It should be noted that class ResolvedB is also a subclass to the super class Object.

The get object used for acquiring construction-element object resolvedA (an instance of class ResolvedA) shown in program list (3) owns a build object which owns a build method calling field setting method setFieldA (ResolvedB f) used for setting field fieldA. To be more specific, build method build (resolvedA) owned by the build object is called to initialize field fieldA.

In this case, however, in order to initialize field fieldA, construction-element object resolvedB, an instance of class ResolvedB, needs to be referenced.

Therefore, the build object which owns a build method calling field setting method setFieldA (ResolvedB f) owns a get object (an instance of the get class) which owns get method getobject ( ) used for acquiring construction-element object resolvedB.

Then, in the build object which owns a build method calling field setting method setFieldA (ResolvedB f), get method getobject ( ) owned thereby is called to acquire construction-element object resolvedB. Thus, a reference to construction-element object resolvedB allows field setting method setFieldA (ResolvedB f) to initialize field fieldA.

It should be noted that, if it is necessary to initialize construction-element object resolvedB, the get object used for acquiring construction-element object resolvedB is provided with a build object for initializing construction-element object resolvedB. The build object then initializes construction-element object resolvedB. In general, after a construction-element object has been acquired, if another construction-element object is found necessary for initializing the acquired construction-element object, the other construction-element object is acquired. Thereafter, if a further other construction-element object is found necessary for initializing the other construction-element object, the further other construction-element object is similarly acquired. This process is repeated to initialize each sequentially acquired construction-element object as will be described more later.

By the way, in the implementation of build method build (Object resolved) defined in the build class, it is necessary to provide a build class for each construction-element object which requires initialization different from those of other construction-element objects if the build method is to be implemented for each build class. In order to solve this problem, much like get method getobject ( ) of the get class described above, build method build (Object resolved) defined in the build class is also made polymorphic, allowing a variety of implementations to be provided to subclasses. Then, a subclass with a desired implementation can be utilized. For example, as subclasses to build class Builder, 2 subclasses, namely, set method build class SetBuilder and add method AddBuilder, are defined as shown in FIG. 8.

Set method build class SetBuilder is defined as a subclass to build class Builder for initialization of field fielda by calling field setting method setFieldA (ResolvedB f) shown in program list (3) as follows.

```
class SetBuilder extends Builder{
    String fieldName;
    String methodName;
    Getter getter;
    void build(Object ressolved){
        Mehtod method=getSetMethod(fieldName,methodName, resolved
        Object objs[]={getter.getObject()};
        method.invoke(resolved,objs);
    }
}
                                       ... (4)
```

Method getSetMethod (fieldname, methodName, resolved) shown in program list (4) constructs an object owning a field setting method specified by argument methodName and used for initializing a field specified by argument fieldName. In the case of program list (4), the constructed object is set in field method of the Method type. That is to say, instance method of the Method class is constructed. It should be noted that, in method getSetMethod (fieldName, methodName, resolved), the type of the object owning a field setting method specified by argument methodName is recognized from arguments fieldName and resolved. Then, the class for the recognized type, that is, the class of the construction-element object, is searched for a field setting method specified by argument methodName.

In addition, in statement Object objs [ ] {getter.getobject ( )}; shown in program list (4), one construction-element object acquired by get method getobject [ ] owned by get object getter is set in array (or field) objs [ ] of the Object type as an element of the array.

Furthermore, in class Method, method invoke (resolved, objs) is defined. Method invoke (resolved, objs) initializes a construction-element object specified by argument resolved by reference to a construction-element object specified by argument objs. In statement method.invoke (resolved, objs); shown in program list (4), method invoke (resolved, objs) in object method is called so as to call a field setting method owned by object method, that is, a method represented by argument methodName in this case. This field setting method initializes a construction-element object specified by argument resolved by reference to a construction-element object specified by argument objs. It should be noted that the $2^{nd}$ argument (that is, an argument placed at the $2^{nd}$ position on the argument list) of method invoke (resolved, objs) is prescribed to be an array. Thus, objs is a field of the array type.

As shown in program list (4), in subclass SetBuilder, build method build (Object resolved) is implemented by reflection, that is, reflecting a definition structure such as a class in the language system. To be more specific, fieldName and methodName are provided respectively as the name of a field to be initialized and the name of a field setting method for initializing the field. Thus, a field setting method owned by object method is called. The field setting method is the same as the field setting method of a construction-element object acquired by get method getobject ( ). As a result, a variety of construction-element objects can be initialized. It should be noted that arguments fieldName and methodName shown in program list (4) can be provided typically by a constructor.

In addition, in order to initialize field painters of the array type for example by means of field setting method add painter (object p, int index) shown in program list (3), it is necessary to define class AddBuilder as a subclass to build class Builder as follows.

```
class AddBuilder extends Builder{
    String fieldName;
    String methodName;
    int index;
    Getter getter;
    void build(Object resolved){
        Method method=getAddMethod(fieldName,methodName,resolove
d);
        Object objs[]={getter.getObject() ,new Integer(index)};
        method.invoke(resolved,objs);
    }
}
                                       ... (5)
```

Much like method getSetMethod (fieldName, methodName, resolved) shown in program list (4), method getAddMethod (fieldName, methodName, resolved) shown in program list (5) constructs an object owning a field setting method specified by argument methodName and used for initializing a field specified by argument fieldName. However, method getAddMethod (fieldName, methodName, resolved) is different from method getSetMethod (fieldName, methodName, resolved) in that, in the case of the former, the type of an object owning the field setting method specified by argument method name is recognized from argument fieldName to be an array of a certain class and, after the class of the array is further recognized, a field setting method represented by argument methodName is found. It should be noted that the field setting method specified by argument methodName is determined in advance to have a field of the int type as a $2^{nd}$ argument as is the case with add painter (Object p, int index) shown in program list (3) for example. Accordingly, the class of the array described above can thereby be recognized. In this case, the fact that a field of the int type is taken as a $2^{nd}$ argument is recognized.

In program list (5), array (field) objs [ ] of the Object type has two array elements, namely, a construction-element object acquired by get method getobject ( ) owned by get object getter and an instance constructed by constructor Integer (index), that is, an instance of the Integer type corresponding to the value of subscript index.

Much like program list (4), also in the case of program list (5), by calling method invoke (resolved, objs) in object method, a field setting method owned by object method is called to initialize construction-element object resolved by a reference to construction-element object objs. The field setting method owned by object method is a method specified by argument methodName.

As shown in program list (5), in subclass AddBuilder, build method build (Object resolved) is implemented by reflection, making it possible to initialize a variety of construction-element objects each having a field of the array type like painters which can not be handled by subclass Setbuilder shown in program list (4).

It should be noted that, much like program list (4), arguments fieldName and methodName shown in program list (5) can be provided typically by a constructor.

Next, the bind class is explained.

Figure 9:
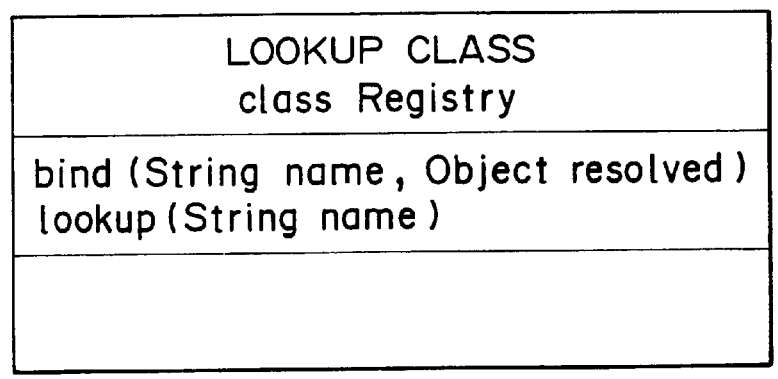
FIG. 9 is a diagram showing a bind class.

The bind class is a class for binding a construction-element object acquired by a get object. As shown in FIG. 9, the bind class has bind method bind (String name, Object resolved) for binding (or cataloging) construction-element object resolved by giving argument name, a string of alphanumeric characters, to the construction-element object and lookup method lookup (String name) for finding a bound (or cataloged) construction-element object with argument name used as a key. Normally, in a bind object (an instance of the bind class), a construction-element object acquired by a get object is bound (or cataloged) by bind method bind (String name, Object resolved). Thus, when it is necessary to refer to the bound construction-element object again, on the other hand, the object can be found by lookup method lookup (String name).

Figure 10:
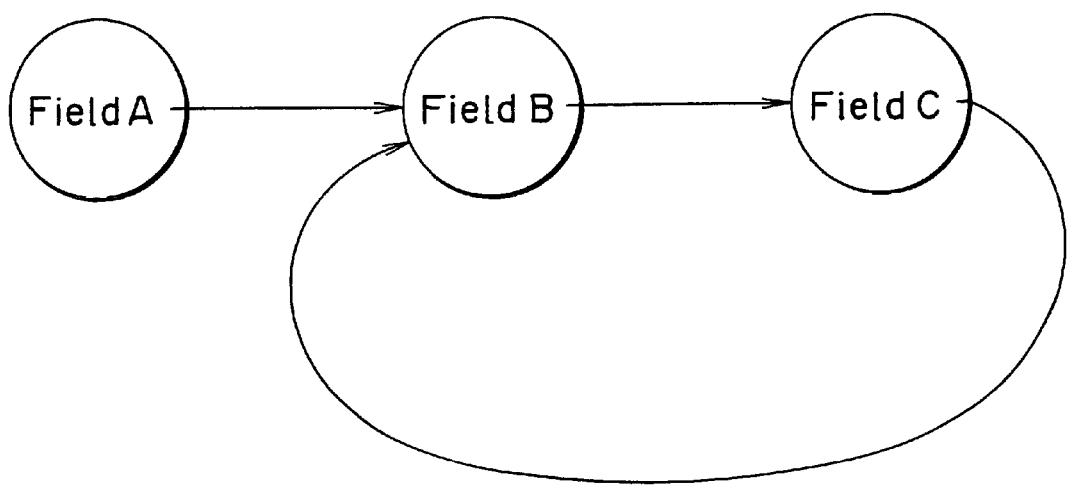
FIG. 10 is an explanatory diagram used for describing a role played by the bind class.

To put it concretely, refer to an example shown in FIG. 10. As shown in the figure, there is desired software such as an application program, multimedia contents or other data which is composed of (or constructed) from three construction-element objects A to C. Assume that field fieldA of construction-element object A is initialized by a reference to construction-element object B, field fieldB of construction-element object B is initialized by a reference to construction-element object C and field fieldC of construction-element object C is initialized also by a reference to construction-element object B. In this case, a reference to construction-element object B is made during initialization of construction-element object C after being made during initialization of construction-element object A.

For this reason, construction-element object B acquired for initialization of construction-element object A is cataloged by bind method bind (String name, object resolved) in a bind object. Then, during initialization of construction-element object C, in the bind object, cataloged construction-element object B is searched for by lookup method lookup (string name) for use in the initialization of construction-element object C.

Figure 11:
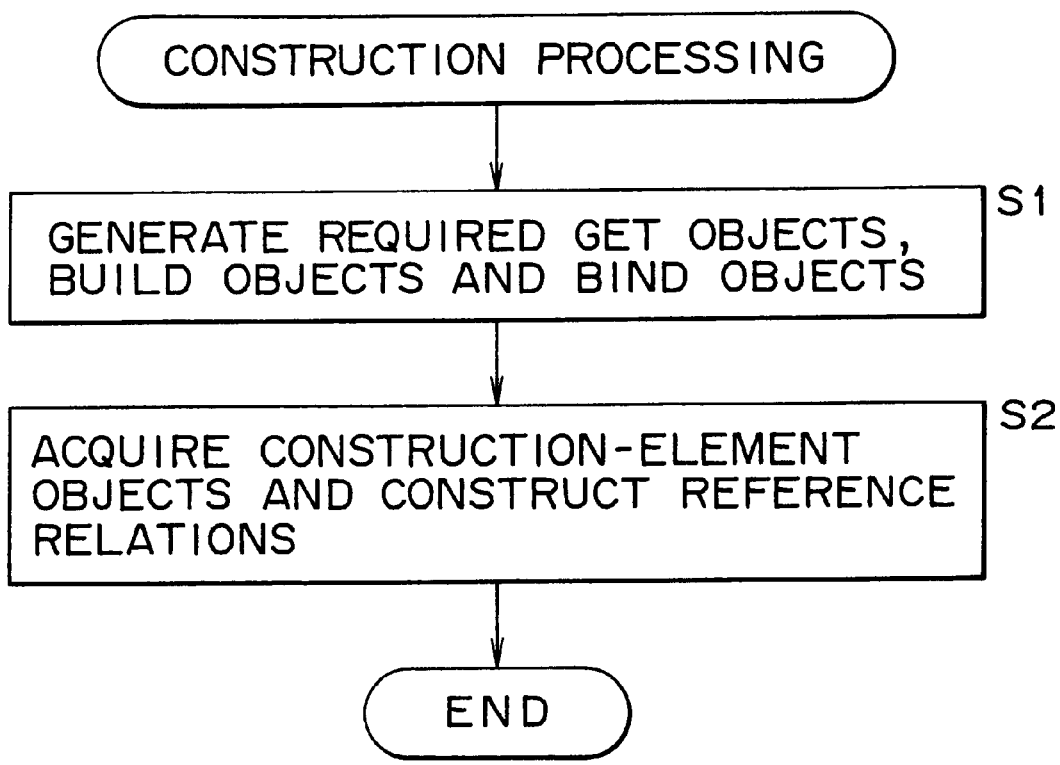
FIG. 11 is a flowchart used for explaining the build processing.

The following is a description of construction processing (or build processing) carried out by execution of a build program at user terminal UT with reference to a flowchart shown in FIG. 11.

As shown in the figure, the construction processing begins with step SI to generate (develop on a memory built in a user terminal) a get object, a build object and a bind object, instances of the get, build and bind classes respectively. The get object is used for acquiring a construction-element object which is used for constructing desired software. The build object is used for building a reference relation among construction-element objects. The bind object is used for binding (or cataloging) a construction-element object to be referenced at a later time. Then, the flow of the processing goes on to step S2 at which the get object, the build object and, if necessary, the bind object generated at step S1 are used for acquiring construction-element objects for constructing the desired software and building reference relations among the construction-element objects. After the construction of the desired software is completed, the processing is ended.

Figure 12:
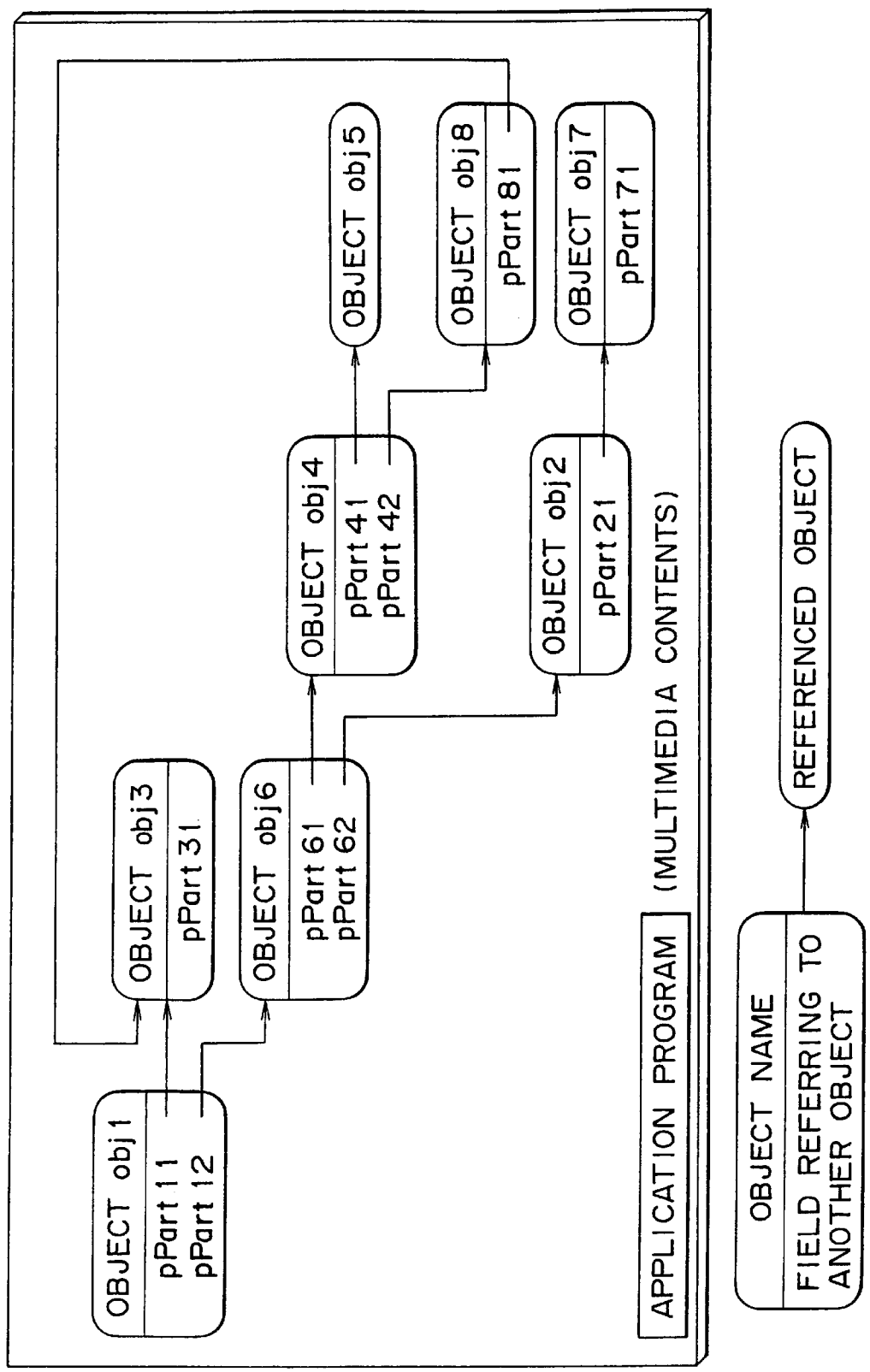
FIG. 12 is a diagram showing reference relations among construction-element objects used for construction of desired software by execution of the build processing.

The following is another description of construction processing to build an application program, multimedia contents or other data which comprises eight construction-element objects obj1 to obj8 having reference relations like ones shown in FIG. 12. Each of construction-element objects obj1 to obj8 shown in FIG. 12 is represented by a rectangular box with the lower level thereof describing the name of a field owned thereby.

Since the desired software, that is, the application program, multimedia contents or other data shown in FIG. 12, is constructed from eight construction-element objects obj1 to obj8, in the first place, get objects (that is, instances of the get class) for acquiring construction-element objects obj1 to obj8 are required. Let Getterl, Getter2, Getter3-1, Getter4, Getter5, Getter6, Getter7 and Getter8 be the get objects for acquiring construction-element objects obj1 to obj8 respectively. In the example shown in FIG. 12, construction-element object obj3 referenced by construction-element object obj1 is also referenced by construction-element object obj8 which is acquired after construction-element object obj3 has been acquired. For this reason, a get object for acquiring construction-element object obj3 during initialization of construction-element object obj8 is required. Let Getter3-2 be this get object. It should be noted that, in order to acquire construction-element object obj3, get object Getter3-2 merely needs to search for construction-element object 3 by calling lookup method lookup (String name) owned by a bind object, an instance of the bind class.

In the embodiment shown in FIG. 12, construction-element object obj1 has fields ppartll and pPart12, construction-element object obj2 has field pPart21, construction-element object obj3 has field pPart31, construction-element object obj4 has fields pPart41 and pPart42, construction-element object obj6 has fields ppart61 and pPart62, construction-element object obj7 has fields ppart71 and construction-element object obj8 has field pPart81 respectively.

In the embodiment shown in FIG. 12, fields ppart11 and ppart12 of construction-element object obj1 are initialized by referencing construction-element objects obj3 and obj6 respectively. Field pPart21 of construction-element object obj2 is initialized by referencing construction-element object obj7. Fields pPart41 and pPart42 of construction-element object obj4 are initialized by referencing construction-element objects obj5 and obj8 respectively. Fields pPart61 and pPart62 of construction-element object obj6 are initialized by referencing construction-element objects obj4 and obj2 respectively. Field pPart81 of construction-element object obj8 is initialized by referencing construction-element object obj3.

As described above, ppart11, pPart12, pPart21, pPart41, pPart42, pPart61, pPart62 and pPart81 are eight fields to be initialized. Let Builder1-1, Builder1-2, Builder2, Builder4-1, Builder4-2, Builder6-1, Builder6-2 and Builder8 be eight build objects required for initializing the eight fields respectively.

It should be noted that, in the embodiment shown in FIG. 12, construction-element object obj3 has field pPart31 and construction-element object obj7 has field pPart71. In the initialization of fields pPart31 and pPart71, however, no construction-element objects are referenced. Thus, no build objects are required for initializing the fields.

As described above, in order to construct the desired software shown in FIG. 12, nine get objects (instances of the get class) and eight build objects (instances of the build class) shown in FIG. 13 are required.

FIGS. 14, 14A and 14B are diagrams showing relations among the nine get objects and the eight build objects. In each of the get objects, get method getobject ( ) is executed and, in each of the build objects, build method build (Object resolved) is executed to carry out the construction processing (or the build processing) to construct (or build) the desired software shown in FIG. 12.

To put it in detail, first of all, get object Getterl acquires construction-element object obj1 by calling get method getobject ( ) owned by get object Getter 1. It should be noted that get object Getterl also owns build objects Builder1-1 and Builder1-2 used for initializing fields pPart11 and pPart12 respectively owned by construction-element object obj1. Strictly speaking, get object Getter1 owns build objects Builder1-1 and Builder1-2 as two elements of array builders [ ] of the Builder type. Then, build objects Builder1-1 and Builder1-2 initialize fields pPart11 and pPart12 respectively.

To put it in detail, in get object Getter1, build method build (Object resolved) of Builder1-1, the 1st one among build objects Builder1-1 and Builder1-2, is first called. It should be noted that build objects Builder1-1 and Builder1-2 are 2 elements of array builders [ ] of the Builder type owned by the get object Getter1, and build object Builder1-1 owns get object Getter3-1 used for acquiring construction-element object obj3 which is referenced during initialization of field pPart11 carried out by build object Builder1-1 as described above. Then, get object Getter3-1 acquires construction-element object obj3. That is to say, in build method build (Object resolved) also owned by build object Builder1-1, get method getobject ( ) owned by get object Getter3-1 is called to acquire construction-element object obj3.

Since it is not necessary to initialize construction-element object obj3, get object Getter3-1 does not own a build object for initializing construction-element object obj3. Thus, the element of array builders [ ] of the array type owned by get object Getter3-1 is null. Therefore, after the processing of get method getobject ( ) owned by get object Getter3-1 is completed, control of execution is returned to the caller.

At that time, get method get object ( ) owned by get object Getter3-1 acquires construction-element object obj3, passing information required for referencing construction-element object obj3 to build object Builder1-1 as a return value. Receiving the information, build object Builder1-1 initializes field pPart11 of construction-element object obj1 by referencing construction-element object obj3. As the initialization of field ppart11 is finished, the processing of build method build (Object resolved) owned by build object Builder1-1 is completed and control of execution is returned to the caller.

When the processing of build method build (Object resolved) owned by build object Builder1-1 is completed, in get object Getter1, build method build (Object resolved) of Builder1-2, the $2^{nd}$ one among build objects Builder1-1 and Builder1-2, is called. As described above, build objects Builder1-1 and Builder1-2 are 2 elements of array builders[ ] of the Builder type owned by the get object Getter1.

By the same token, build object Builder1-2 owns get object Getter6 used for acquiring construction-element object obj6 which is referenced during initialization of field pPart12 carried out by build object Builder1-2. Then, get object Getter6 acquires construction-element object obj6. To put it in detail, in build method build (Object resolved) also owned by build object Builder1-2, get method getobject ( ) owned by get object Getter6 is called to acquire construction-element object obj6.

Much like get object Getter1, get object Getter6 also owns build objects Builder6-1 and Builder6-2 used for initializing fields pPart61 and pPart62 respectively owned by construction-element object obj6. Strictly speaking, get object Getter6 owns build objects Builder6-1 and Builder6-2 as 2 elements of array builders [ ] of the Builder type. Then, build objects Builder6-1 and Builder6-2 initialize fields pPart61 and pPart62 respectively.

To put it in detail, in get object Getter6, build method build (Object resolved) of Builder6-1, the $1^{st}$ one among build objects Builder6-1 and Builder6-2, is first called. It should be noted that build objects Builder6-1 and Builder6-2 are two elements of array builders[ ] of the Builder type owned by the get object Getter6, and build object Builder6-1 owns get object Getter4 used for acquiring construction-element object obj4 which is referenced during initialization of field pPart61 carried out by build object Builder6-1 as described above. Then, get object Getter4 acquires construction-element object obj4. That is to say, in build method build (Object resolved) also owned by build object Builder6-1, get method get object ( ) owned by get object Getter4 is called to acquire construction-element object obj4.

Much like get object Getter1, get object Getter4 also owns build objects Builder4-1 and Builder4-2 used for initializing fields pPart41 and pPart42 respectively owned by construction-element object obj4. Strictly speaking, get object Getter4 owns build objects Builder4-1 and Builder4-2 as two elements of array builders [ ] of the Builder type. Then, build objects Builder4-1 and Builder4-2 initialize fields pPart41 and pPart42 respectively.

To put it in detail, in get object Getter4, build method build (Object resolved) of Builder4-1, the $1^{st}$ one among build objects Builder4-1 and Builder4-2, is first called. It should be noted that build objects Builder4-1 and Builder4-2 are two elements of array builders[ ] of the Builder type owned by the get object Getter4, and build object Builder4-1 owns get object Getter5 used for acquiring construction-element object obj5 which is referenced during initialization of field pPart41 carried out by build object Builder4-1 as described above. Then, get object Getter5 acquires construction-element object obj5.

Since it is not necessary to initialize construction-element object obj5, get object Getter5 does not own a build object for initializing construction-element object obj5. Thus, the element of array builders [ ] of the array type owned by get object Getter5 is null. Therefore, after the processing of get method getobject ( ) owned by get object Getter5 is completed, control of execution is returned to the caller.

At that time, get method getobject ( ) owned by get object Getter5 acquires construction-element object obj5, passing information required for referencing construction-element object obj5 to build object Builder4-1 as a return value. Receiving the information, build object Builder4-1 initializes field pPart41 of construction-element object obj4 by referencing construction-element object obj5. As the initialization of field pPart41 is finished, the processing of build method build (Object resolved) owned by build object Builder4-1 is completed and control of execution is returned to the caller.

When the processing of build method build (Object resolved) owned by build object Builder4-1 is completed, in get object Getter4, build method build (Object resolved) of Builder4-2, the $2^{nd}$ one among build objects Builder4-1 and Builder4-2, is called. As described above, build objects Builder4-1 and Builder4-2 are 2 elements of array builders[ ] of the Builder type owned by the get object Getter4.

By the same token, build object Builder4-2 owns get object Getter8 used for acquiring construction-element object obj8 which is referenced during initialization of field pPart42 carried out by build object Builder4-2. Then, get object Getter8 acquires construction-element object obj8.

Get object Getter8 also owns build object Builder8 used for initializing field pPart81 owned by construction-element object obj8 as the only element of single-element array builders [ ] of the Builder type. Then, build object Builder8 initializes field pPart81.

To put it in detail, in get object Getter8, build method build (Object resolved) of Builder8, the only element of single-element array builders [ ] of the Builder type owned by the get object Getter8, is first called. It should be noted that build object Builder8 owns get object Getter3-2 used for acquiring construction-element object obj3 which is referenced during initialization of field pPart81 carried out by build object Builder8 as described above. Then, get object Getter3-2 acquires construction-element object obj3. That is to say, in build method build (Object resolved) also owned by build object Builder8, get method getobject ( ) owned by get object Getter3-2 is called to acquire construction-element object obj3.

It should be noted that construction-element object obj3 referenced earlier by construction-element object obj1 is also referenced by construction-element object obj8 acquired later than construction-element object obj3 as is known in advance. For this reason, when get object Getter3-1 acquired construction-element object obj3, bind method bind (String name, Object resolved) of a bind object was called to catalog construction-element object obj3 acquired by get object Getter3-1. Thus, get object Getter3-2 in actuality merely obtains information required for referencing construction-element object obj3 already cataloged by calling lookup method lookup (string name) instead of acquiring construction-element object obj3 itself.

It is not necessary to initialize construction-element object obj3. This is because, in the embodiment shown in FIG. 12, construction-element object obj3 is, from the beginning, a construction-element object that does not have a field to be initialized. Even if construction-element object obj3 has a field to be initialized, the field should have been initialized by build object owned by get object Getter3-1 when construction-element object obj3 was acquired thereby. For this reason, get object Getter3-2 does not own a build object for initializing construction-element object obj3. Thus, the element of array builders [ ] of the array type owned by get object Getter3-2 is null. Therefore, after the processing of get method getobject ( ) owned by get object Getter3-2 is completed, control of execution is returned to the caller.

At that time, get method getobject ( ) owned by get object Getter3-2 acquires construction-element object obj3, passing the information to build object Builder8 as a return value. Receiving the information, build object Builder8 then initializes field pPart81 of construction-element object obj8 by referencing construction-element object obj3. As the initialization of field pPart81 is finished, the processing of build method build (Object resolved) owned by build object Builder8 is completed and control of execution is returned to the caller.

The completion of the processing of build method build (Object resolved) owned by build object Builder8 also completes the processing of get method getobject of get object Getter8. Information required for referencing construction-element object obj8 acquired thereby is passed as a return value to build object Builder4-2. Receiving the information, build object Builder4-2 initializes field pPart42 of construction-element object obj4 by referencing construction-element object obj8. As the initialization of field pPart42 is finished, the processing of build method build (Object resolved) owned by build object Builder4-2 is completed and control of execution is returned to the caller.

The completion of the processing of build method build (Object resolved) owned by build object Builder4-2 also completes the processing of get method getObject ( ) of get object Getter4. Information required for referencing construction-element object obj4 acquired thereby is passed as a return value to build object Builder6-1. Receiving the information, build object Builder6-1 initializes field pPart61 of construction-element object obj6 by referencing construction-element object obj4. As the initialization of field pPart61 is finished, the processing of build method build (Object resolved) owned by build object Builder6-1 is completed and control of execution is returned to the caller.

When the processing of build method build (Object resolved) owned by build object Builder6-1 is completed, in get object Getter6, build method build (Object resolved) of Builder6-2, the $2^{nd}$ one among build objects Builder6-1 and Builder6-2, is called. As described above, build objects Builder6-1 and Builder6-2 are 2 elements of array builders[ ] of the Builder type owned by the get object Getter6.

By the same token, build object Builder6-2 owns get object Getter2 used for acquiring construction-element object obj2 which is referenced during initialization of field pPart62 carried out by build object Builder6-2. Then, get object Getter2 acquires construction-element object obj2.

Get object Getter2 also owns build object Builder2 used for initializing field pPart21 owned by construction-element object obj2 as the only element of single-element array builders [ ] of the Builder type. Then, build object Builder2 initializes field pPart21.

To put it in detail, in get object Getter2, build method build (Object resolved) of Builder2, the only element of single-element array builders [ ] of the Builder type owned by the get object Getter2, is first called. It should be noted that build object Builder2 owns get object Getter7 used for acquiring construction-element object obj7 which is referenced during initialization of field pPart21 carried out by build object Builder2 as described above. Then, get object Getter7 acquires construction-element object obj7.

Since it is not necessary to initialize construction-element object obj7, get object Getter7 does not own a build object for initializing construction-element object obj7. Thus, the element of array builders [ ] of the array type owned by get object Getter7 is null. Therefore, after the processing of get method getObject ( ) owned by get object Getter7 is completed, control of execution is returned to the caller.

At that time, get method getobject ( ) owned by get object Getter7 acquires construction-element object obj7, passing information required for referencing construction-element object obj7 to build object Builder2 as a return value. Receiving the information, build object Builder2 initializes field pPart21 of construction-element object obj2 by referencing construction-element object obj7. As the initialization of field pPart21 is finished, the processing of build method build (Object resolved) owned by build object Builder2 is completed and control of execution is returned to the caller.

The completion of the processing of build method build (Object resolved) owned by build object Builder2 also completes the processing of get method getObject ( ) of get object Getter2. Information required for referencing construction-element object obj2 acquired thereby is passed as a return value to build object Builder6-2. Receiving the information, build object Builder6-2 initializes field pPart62 of construction-element object obj6 by referencing construction-element object obj2. As the initialization of field pPart62 is finished, the processing of build method build (Object resolved) owned by build object Builder6-2 is completed and control of execution is returned to the caller.

The completion of the processing of build method build (Object resolved) owned by build object Builder6-2 also completes the processing of get method getObject ( ) of get object Getter6. Information required for referencing construction-element object obj6 acquired thereby is passed as a return value to build object Builder1-2. Receiving the information, build object Builder1-2 initializes field pPartl2 of construction-element object obj1 by referencing construction-element object obj6. As the initialization of field pPart12 is finished, the processing of build method build (Object resolved) owned by build object Builder1-2 is completed and control of execution is returned to the caller.

The completion of the processing of build method build (Object resolved) owned by build object Builder1-2 also finishes the processing of get method getObject ( ) of get object Getter1, completing the construction of the desired software shown in FIG. 12.

As described above, a plurality of construction-element objects used as elements for constructing an application program or a plurality of construction-element objects used as elements for constructing multimedia contents or other data utilized by an application program are acquired by get objects and reference relations among the construction-element objects are built by build objects. As a result, an application program or multimedia contents or other data utilized by an application program can be constructed by collecting only necessary construction-element objects only when they are required in order to dynamically link the construction-element objects, that is, to build reference relations among the construction-element objects, even if the construction-element objects are originally distributed among apparatuses information, build throughout a network.

It should be noted that a construction-element object is allowed to own a build object for building a new reference relation to the construction-element object.

To put it in detail, the class of the construction-element object can be typically defined by the following program list.

```
class ResolvedD extends Object{
    private int fieldA;
    private Builder builder;
    public void setFieldA(int f){
        fieldA=f;
    }
    public void setBuilder(Builder f){
        builder=f;
    }
    public void rebuild(){
        builder.build(this);
    }
}                                    . . . (6)
```

In the construction-element object of class ResolvedD like program list (6) shown above, field fieldA is initialized in the same way as described above. In addition, field builder is also initialized by a certain build object. By calling build method build (Object resolved) in the initialized field builder, a reference relation in desired software can be built dynamically during program execution of the software. In program list (6), build method build (Object resolved) in the initialized field builder is expressed as builder.build (this). Thus, calling build method build (Object resolved) in the initialized field builder means calling method rebuild ( ) described in program list (6). In this way, is possible to delete an already existing construction-element object of desired software, replace a construction-element object already existing in desired software with another or add a new a construction-element object to desired software even after the construction of the desired software has once been completed.

As described above, the embodiment is exemplified by a case in which construction-element objects are scattered throughout a network or distributed among geographically scattered sites. It should be noted that the present invention can also be applied to a case in which construction-element objects are distributed along a time axis. It is needless to say that the present invention can also be applied to a case in which construction-element objects all exist at a site, for example, in the hard disc 17 of the STB 4 shown in FIG. 2.

In addition, in the embodiment described above, the build program is stored in the hard disc 17 of the STB 4. It is worth noting that a build program required for building desired software can be obtained from the Internet 6 when needed. In this case, the amount of received data is small in comparison with a case in which an EPG itself is received.

Furthermore, in the embodiment, the present invention is applied to construction of an EPG. It should be noted that the present invention can also be applied to construction of an application program or multimedia contents or other data used by an application program in addition to an EPG.

In addition, in the embodiment, a build program and each construction-element object are described in the Java language. It is worth noting that another computer language can also be used to described them as well. However, it is desirable to use the so-called object oriented language such as Java, C++ or smalltalk.

Furthermore, in this embodiment, three kinds of object, namely, get objects, build objects and bind objects, are used to construct desired software. It should be noted that only get and build objects can be used. In this case, in a build object, it is possible to let a bind object carry out bind processing.

In the information processing apparatus, the information processing method and the recording medium according to the present invention, a get object is used for acquiring a construction-element object by using a get method of the get object and a build object owned by a get object is used for initializing a construction-element object acquired by the get object by using a build method owned by the build object. As a result, an application program or multimedia contents used by an application program can be built or constructed by collecting construction-element objects even if the collecting-element objects are distributed among geographically scattered sites or along a time axis.

What is claimed is:

1. An information processing apparatus for carrying out processing to construct desired software by acquiring a plurality of construction-element objects required for constructing said desired software and initializing said construction-element objects, said information processing apparatus comprising:

build objects each owning a build method which is used for constructing reference relations among said construction-element objects by calling a field setting method if said construction-element objects each have said field setting method for setting a field of said construction-element object in order to initialize said construction-element object; and get objects which each own a get method for acquiring a construction-element object and are each capable of owning one of said build objects, wherein said get objects are each used for acquiring a construction-element object by using said get method of said get object;

said build object owned by said get object is used for initializing a construction-element object acquired by said get object by using said build method owned by said build object; and each of said construction-element objects is capable of owning one of said field setting method or a plurality of said field setting methods.

2. An information processing apparatus according to claim 1, wherein said build objects are each capable of owning one of said get objects; and said get object owned by said build object used for initializing a construction-element object is used for acquiring another construction-element object required for initializing said construction-element object.

3. An information processing apparatus according to claim 2 further comprising a bind object owning a method for cataloging a construction-element object acquired by any of said get objects wherein, if said other construction-element object required for initializing said construction-element object has been cataloged by said bind method, said get object acquires said cataloged construction-element object.

4. An information processing apparatus according to claim 1, wherein each of said construction-element objects is capable of owning a build object for building a new reference relation with said construction-element object.

5. An information processing apparatus according to claim 1, wherein said get method or said build method is a polymorphic method.

6. An information processing apparatus according to claim 1, wherein said get object is capable of owning one said build object or a plurality of said build objects; and said build objects of said get object are each used for initializing one of fields of a construction-element object acquired by said get object by using said build method of said build object.

7. An information processing apparatus according to claim 1, wherein said construction-element objects are distributed among geographically scattered sites or distributed along a time axis.

8. An information processing method adopted in an information processing apparatus for carrying out processing to construct desired software by acquiring a plurality of construction-element objects required for constructing said desired software and initializing said construction-element objects, said information processing apparatus comprising:

build objects each owning a build method which is used for constructing reference relations among said construction-element objects by calling a field setting method if said construction-element objects each have said field setting method for setting a field of said construction-element object in order to initialize said construction-element object; and get objects which each own a get method for acquiring a construction-element object and are each capable of owning one of said build objects, wherein said get objects are each used for acquiring a construction-element object by using said get method of said get object;

said build object owned by said get object is used for initializing a construction-element object acquired by said get object by using said build method owned by said build object and wherein each of said construction-element objects is capable of owning one of said field setting method or a plurality of said field setting methods.

9. A recording medium for recording a computer program to be executed by a computer to carry out processing of constructing desired software by acquiring a plurality of construction-element objects required for constructing said desired software and initializing said construction-element objects, wherein said computer program comprises:

build objects each owning a build method which is used for constructing reference relations among said construction-element objects by calling a field setting method if said construction-element objects each have said field setting method for setting a field of said construction-element object in order to initialize said construction-element object, each of said construction-element objects being capable of owning one of said field setting method or a plurality of said field setting methods; and get objects which each own a get method for acquiring a construction-element object and are each capable of owning one of said build objects, said processing comprising the steps of letting each of said get objects acquire a construction-element object by using said get method of said get object; and letting said build object owned by said get object initialize a construction-element object acquired by said get object by using said build method owned by said build object.

* * * * *